J. J. O'CONNELL.
HORSE OVERSHOE.
APPLICATION FILED NOV. 7, 1912. RENEWED JAN. 6, 1914.
1,086,305.
Patented Feb. 3, 1914.
2 SHEETS—SHEET 2.
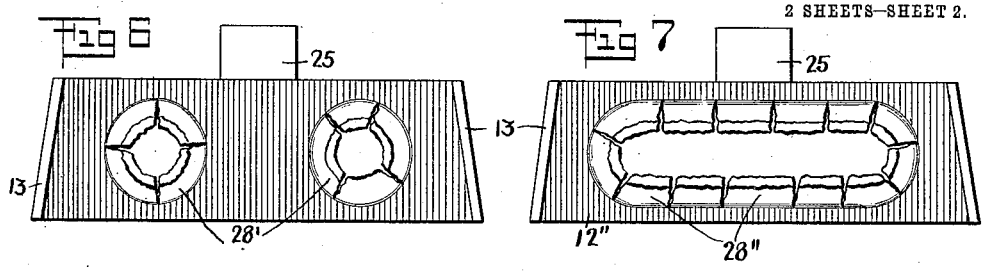
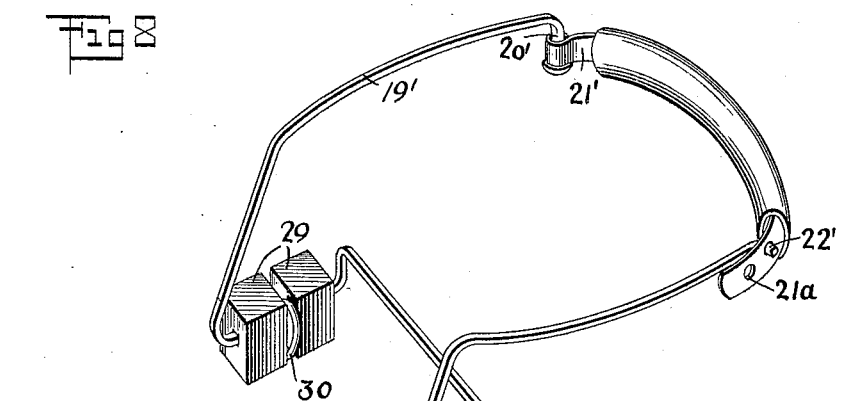
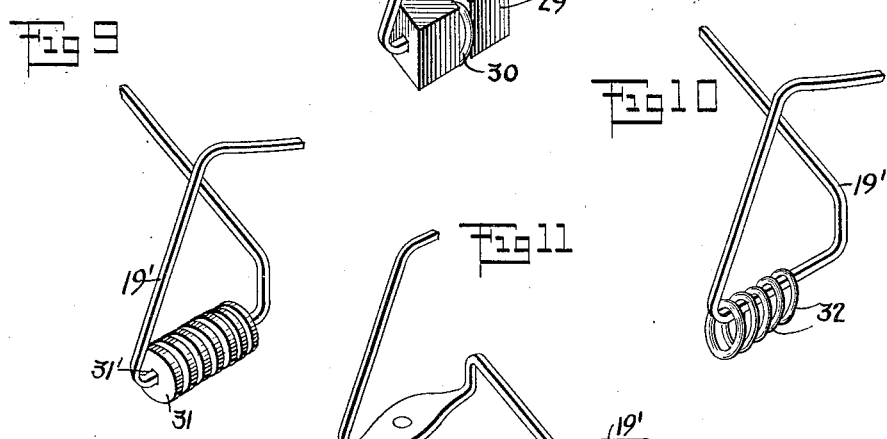
WITNESSES
C. J. Hachenberg.
Geo. L. Beeler
INVENTOR
JOHN J. O'CONNELL,
BY Munn & Co
ATTORNEYS

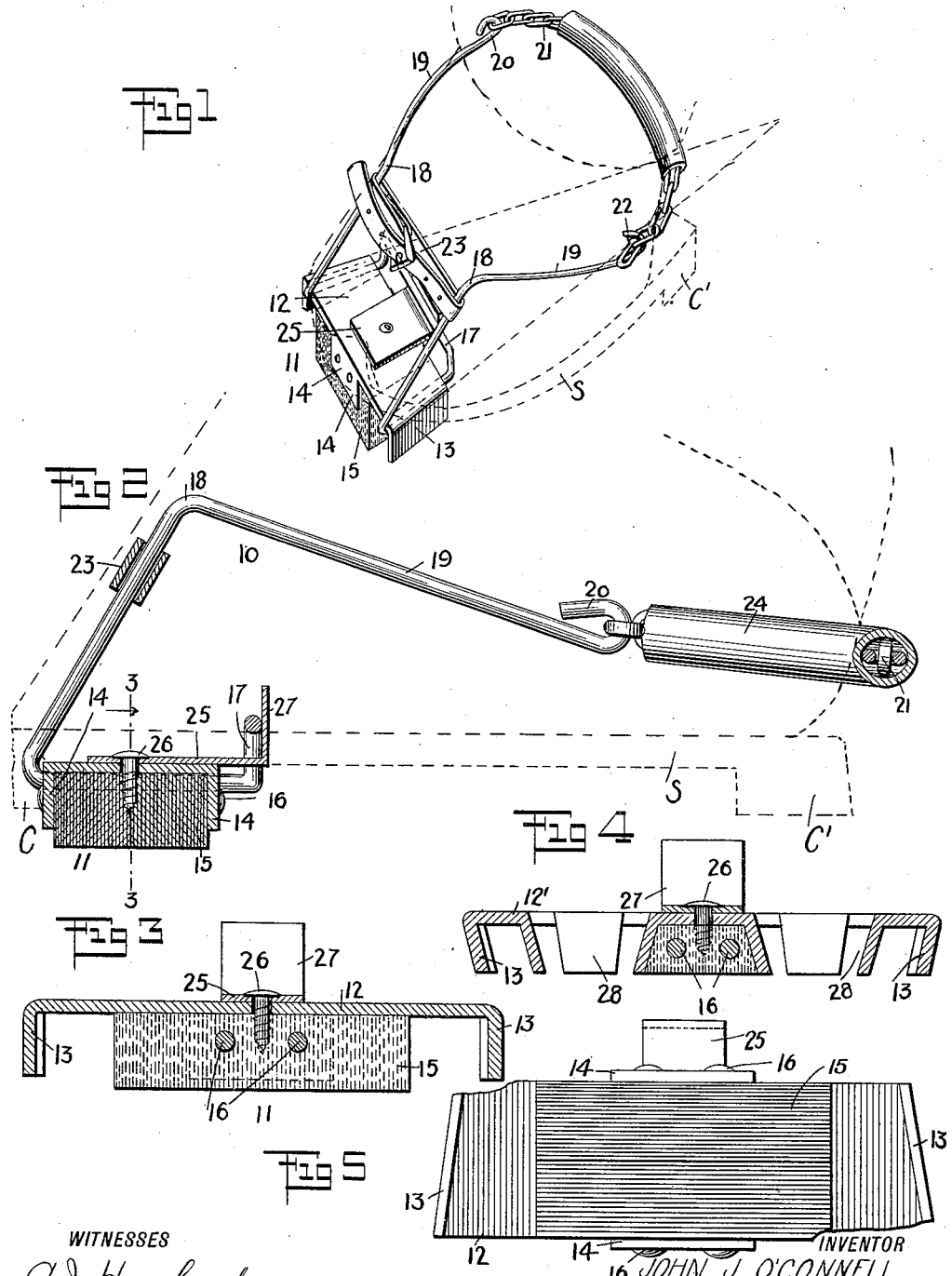

UNITED STATES PATENT OFFICE.

JOHN J. O'CONNELL, OF RIDGEWOOD, NEW JERSEY.

HORSE-OVERSHOE.

1,086,305.

Specification of Letters Patent.

Patented Feb. 3, 1914.

Application filed November 7, 1912, Serial No. 729,984. Renewed January 6, 1914. Serial No. 810,561.

*To all whom it may concern:*

Be it known that I, JOHN J. O'CONNELL, a citizen of the United States, and a resident of Ridgewood, in the county of Bergen and State of New Jersey, have invented a new and Improved Horse-Overshoe, of which the following is a full, clear, and exact description.

This invention relates to farriery and has particular reference to a temporary attachment or overshoe to be applied in slippery or icy weather to prevent the ordinary horseshoe from slipping when the calks thereof, because of being blunt or otherwise, will not hold the horse securely.

Among the objects of the invention is to provide a horse overshoe which may be easily and quickly applied or removed when necessary and which may be made and sold at a moderate price, but possessing the maximum degree of efficiency and reliability for the uses set forth.

A further object of the invention is to provide a main frame with means for attaching the same to the horse's hoof and associated therewith is a renewable cheap attachment which is subjected to rough wear or usage and which may be detached from the other part of the structure quickly and without special tools for renewing purposes.

The foregoing and other objects of the invention will hereinafter be more fully described and claimed and illustrated in the drawings accompanying this specification in which like characters of reference indicate corresponding parts in all the views, and in which Figure 1 is a perspective view of a preferred form of the invention shown substantially in the position it occupies when secured to a horse's hoof; Fig. 2 is a vertical longitudinal section of the same; Fig. 3 is a transverse sectional detail substantially on the line 3—3 of Fig. 2; Fig. 4 is a view similar to Fig. 3, illustrating a slight modification; Figs. 5, 6 and 7 are bottom plan views of different forms of treads; Fig. 8 is a perspective view of a yoke differing in character from that shown in Fig. 1 with respect to the form of the metal and the attaching means; and Figs. 9, 10 and 11 show various modifications of means to be used as substitutes for the tread shown in certain other views as including a plate.

In carrying this invention into practice it will be understood that it is especially adapted for application to a hoof already shod with the usual horseshoe, the device being adapted especially for city or other paved streets upon which only shod horses are driven. The usual horeshoe, therefore, constitutes not only a rigid brace for the hoof, preventing distortion thereof and injury to the horse's foot, but also constitutes a means for securing the overshoe attachment from displacement, it, of course, being understood that such devices are subjected naturally to very rough usage.

The invention herein disclosed comprises two principal parts, namely, a yoke 10 and a tread 11. The tread is clamped by the yoke beneath the front or toe portion of the hoof just back of the rear face of the toe calk, and the yoke in turn is secured to the hoof by easily manipulated devices so that the overshoe as a whole may be quickly applied to or removed from the hoof.

The tread in its preferred form comprises a plate 12 of substantial sheet metal, the principal part of which is flat and lies in place snugly against the bottom face of the shoe S, and the front edge of said plate at its intermediate portion lies just back of the rear face of the toe calk C. The ends 13 of the plate 12 are bent downwardly in vertical planes which converge to a point substantially beneath the horse's fetlock. Said ends constitute a pair of auxiliary calks which increase the compass of the attachment, insuring against excessive tilting of the horse's toe and assisting in preventing slipping after the attachment may have become somewhat worn, these auxiliary calks coöperating, of course, with the heel calks C' of the shoe S. The extensions of the plate 12 adjacent the calks 13 constitute a means whereby the lower portion of the yoke will secure the tread in place. The plate has also connected to it or formed integral therewith a pair of transversely extending and downwardly projecting parallel lugs 14 which are preferably of a width substantially equal to the width of the plate 12 in the longitudinal direction of the foot. Said lugs 14 constitute a means coöperating with the plate 12 for securing a pad 15 to the plate, said pad preferably comprising one or more blocks of tough fibrous material such as piston packing composed of a series of laminæ arranged in vertical transverse planes as shown in Fig. 2. Said pad is secured in place between the lugs 14 by any suitable number of screws or rivets 16. The nature of the pad is such that it will constitute a substantially broad bearing contact for the horse's toe and by reason of the preferred material above indicated the laminæ will collect and carry sand, gravel or other gritty material which will materially assist in increasing the frictional grip upon a slippery street.

The yoke above referred to is made preferably of rod iron or other metal bar, the intermediate portion of which is looped or U-shaped and extends rearwardly beneath and in embracing contact with the lower surface of the plate 12 adjacent the calks 13 and just in the rear of the shoe S, and the crotch 17 of the loop is bent vertically embracing the rear edge of the front part of the shoe. The free ends of the yoke extend upwardly from the toe of the shoe approximately parallel to each other for a portion of the distance and thence are bent outwardly from each other at 18, forming curved arms 19 which embrace the curved sides of the horse's hoof. One of said arms terminates in an eye 20 to which is connected a flexible member such as a chain 21, which extends around the bottom of the hoof, the loose end of the chain being adjustably connected to a hook 22 constituting the extreme end of the other arm 19.

In applying the overshoe to a shod hoof, the tread being put in place upon the loop of the yoke, the chain 21, of course, being loose from the hook 22, the tread will be brought directly into contact with the bottom of the shoe with a combined vertical and rearward movement of the yoke, and the arms 19 will be shoved directly over the hoof. When the yoke will have been thus brought into place in contact with the rear edge of the shoe, the operator will pass the free end of the chain 21 around, and holding said chain in one hand and pressing down with his other hand or thumb upon the arm 19 bearing the hook 22, he will draw the chain into snug engagement with said hook. This operation will constitute a partial clamping means for the attachment, but the next step is to pass a strap 23 around the elbows 18 of the yoke and the operator then draws the strap substantially tight where it is buckled. It is to be understood that the yoke material will be sufficiently rigid for the purpose of holding the tread in place and yet will be sufficiently flexible to enable the application of the strap to bind the tread snugly in the place indicated, where it will be held by the combined effect of the chain 21 and the toggle effect of the upper portions of the yoke, due to the application of the strap 23. It will, therefore, be seen that this overshoe may be applied to or removed from a shod hoof without tools.

The chain 21 may be housed in a flexible rubber tube or the like 24, if desired, to make it more comfortable for the horse. It will be noted also that the coöperation between the crotch 17 and the plate 12 may be increased by the use of a clip 25 shown as comprising a horizontal member connected by a screw or the like 26 to the central portion of the plate and also including an upwardly extending member 27 in engagement with the crotch 17. By this means it is not necessary for the tread to have direct bearing upon the rear face of the toe calk, for the reason that the upwardly extending crotch 17 will bear at its ends or shoulders against the inner edge of the shoe.

Fig. 4 is a detail of the tread member, the same comprising a plate 12' having downwardly extending lugs or calks formed from and integral with said plate, and also including an upwardly extending member 27 adapted to coöperate with the rear edge of the toe portion of the regular shoe. This form of tread is detachably connected to the yoke in the same manner as the tread described in Figs. 1 and 2.

As shown in Fig. 6, the plate of a nature similar to the plate 12' shown in Fig. 4, is provided with a plurality of downwardly projecting hollow conical projections 28'. The lower edges of these projections constitute the points of contact and because of the nature of the metal from which they are formed they will remain substantially sharp so long as there is any part of the plate remaining. The form of the plate 12'' shown in Fig. 7 differs in providing a single downward projection 28'' having an elliptical edge adapted to engage the pavement. In both forms of these plates the projections are made by stamping or swaging downward upon the metal from which the plates are formed. These plates are of a simple nature and are adapted to be secured to the yoke and held in place thereby in a manner adapting them to be easily renewed, when necessary, by the means above described. It is to be understood in this connection that the non-metallic pad is not necessary in all instances for a proper operation of this overshoe.

In that form of yoke 19' shown in Fig. 8, the metal is indicated as square in cross section and it is secured at the rear by means of a metallic strap 21' which has a series of holes 21ᵃ adapted to coöperate with the hook 22', the other end of the strap being bent into a loop pivoted upon a finger 20' and secured thereon in any suitable manner.

As a substitute for the flat tread previously described and held in place by means of the looped portion of the yoke, I show a series of disconnected elements slipped directly upon the side bars of the yoke. In Fig. 8 these elements include a pair of blocks 29 which may be made of any suitable material such as rubber or other composition and which may be flexible enough to be passed upon said bars. These blocks may be arranged with any suitable number of loose rings 30 which will assist in increasing the gripping effect of the device upon the pavement and otherwise protect the blocks.

In Fig. 9 are shown a set of disks 31 of any suitable form but provided with square holes 31' whereby the disks are prevented from rotation on the bars. These disks and also the rings 32 shown in Fig. 10 act, with respect to the pavement, somewhat in the same manner as do the links of a chain, but I have found them superior to chains for this purpose because of the added reliability and interchangeability of the parts.

As indicated in Fig. 11, the yoke or the bottom part of it may be formed of flat metal or may be flattened at certain points, as indicated at 33, and these flattened parts may be tapped and fitted with removable and renewable pointed calks of any suitable description. As heretofore ordinarily constructed, to refit a horseshoe with a new set of calks, it is necessary to either remove the shoe from the hoof or else the farrier is obliged to handle the horse's foot while making the change. In this instance the overshoes may be refitted when detached from the horse's feet and again buckled or secured in place as already described.

Having thus described my invention, I claim as new and desire to secure by Letters Patent:—

1. In a horse overshoe, the combination of a tread comprising a metallic plate extending transversely of the horse's toe, integral portions of the plate being bent downwardly, said plate also having secured thereto an upwardly projecting member engageable with the rear edge of the toe portion of the regular horseshoe, a yoke including a loop extending beneath said plate and securing the same detachably in position, the crotch of the loop coöperating with said upwardly projecting tread member, the free ends of the yoke embracing the horse's hoof, and hand operated means clamping the free ends of the yoke snugly to the hoof and thereby securing the tread in place.

2. In a horse overshoe, the combination of a tread comprising a metallic plate extending transversely of the horse's toe, the ends of said plate being bent downwardly in vertical planes, and also including a broad non-metallic pad secured to said plate, a yoke including a loop extending beneath said plate and coöperating with said plate ends, the crotch of the loop being bent upwardly, the free ends of the yoke embracing the horse's hoof, and hand operated means clamping the free ends of the yoke snugly to the hoof and thereby securing the tread in place, as indicated.

3. In a horse overshoe, the combination of a tread including a non-metallic pad and means clamping the tread beneath the horse's toe and back of the toe calk of an ordinary shoe, said clamping means comprising a yoke, the intermediate portion of which is looped and embraces the tread, and the upper free ends of which extend along and around the horse's hoof, a flexible member connected permanently to one of said ends and adjustably connected around the hoof to the other of the yoke ends, and a strap buckled across the front of the hoof and coöperating with the upper portions of the yoke with a toggle effect.

4. The herein described horse overshoe comprising a yoke made of a single bar of metal, the intermediate portion of which is looped and bent rearwardly and upwardly for coöperation with the toe of an ordinary horseshoe, the other portions of the yoke extending upwardly and rearwardly and embracing the sides of the horse's hoof, means connecting the ends of the yoke at the back of the horse's hoof, and a strap extending across the front of the horse's hoof and adapted to draw the upwardly extending portions of the yoke toward each other.

5. In a horse overshoe, the combination of a yoke comprising a unitary strip of metal bent into a loop at its intermediate portion which is adapted to extend beneath the horse's toe and thence upwardly just in the rear of the front part of the shoe, the free ends of the yoke extending upwardly from the toe along the hoof and thence extending around and embracing the sides of the hoof, means coöperating with the free portions of the yoke to clamp the same around the horse's hoof, and detachable traction means carried by the yoke and secured thereby in place beneath the horse's toe.

In testimony whereof I have signed my name to this specification in the presence of two subscribing witnesses.

JOHN J. O'CONNELL.

Witnesses:
 GEO. L. BEELER,
 PHILIP D. ROLLHAUS.

---

Copies of this patent may be obtained for five cents each, by addressing the "Commissioner of Patents, Washington, D. C."